No. 744,175. PATENTED NOV. 17, 1903.
F. DEDREUX.
FEEDER FOR BAG FILLING MACHINES.
APPLICATION FILED JULY 15, 1903.
NO MODEL.

Witnesses
M. E. Corder
Geo. E. Few

Inventor
Frederick Dedreux
by Milo B. Stevens & Co
Attorneys

No. 744,175. Patented November 17, 1903.

UNITED STATES PATENT OFFICE.

FREDERICK DEDREUX, OF CLEVELAND, OHIO.

FEEDER FOR BAG-FILLING MACHINES.

SPECIFICATION forming part of Letters Patent No. 744,175, dated November 17, 1903.

Application filed July 15, 1903. Serial No. 165,595. (No model.)

*To all whom it may concern:*

Be it known that I, FREDERICK DEDREUX, a citizen of the United States, residing at Cleveland, in the county of Cuyahoga and State of Ohio, have invented new and useful Improvements in Feeders for Bag-Filling Machines, of which the following is a specification.

This invention relates particularly to feeders for that class of bag-filling machines used for filling bags with salt or other granular material; and the object of the invention is to produce an improved construction with respect to the hoppers or buckets, within which the feeding-wheels revolve. It is customary in similar constructions to have a hopper for the salt or other material and below that a casing, within which the wheel revolves to feed the stuff into the bag. By my invention the casing below the hopper is dispensed with, and the buckets or hoppers are so formed that the feeding-wheels may be located therein and the buckets removed from the shaft carrying the feed-wheels at any time desired.

Other objects and advantages will appear from the following description and claims and the accompanying drawings, in which—

Figure 1:
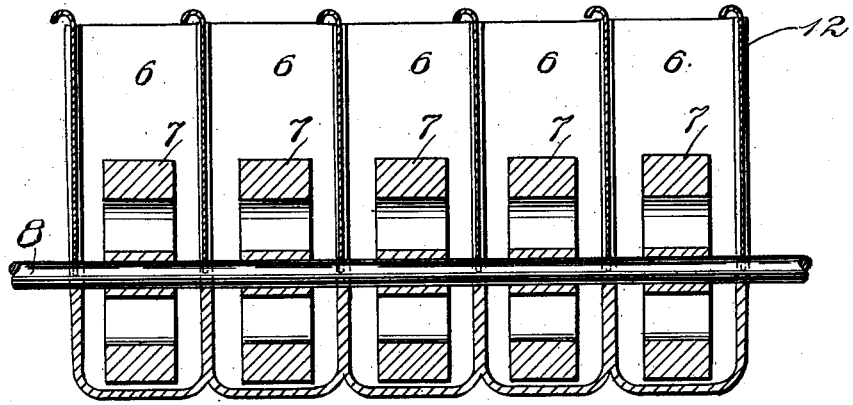
Figure 2:
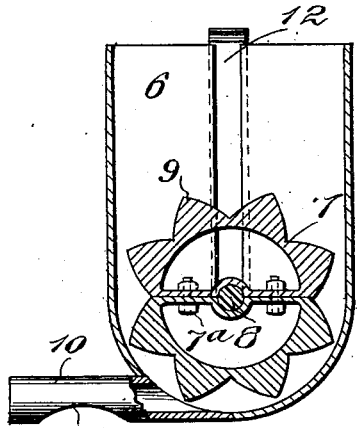
Figure 3:
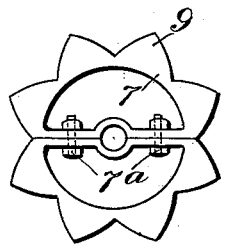
Figure 4:
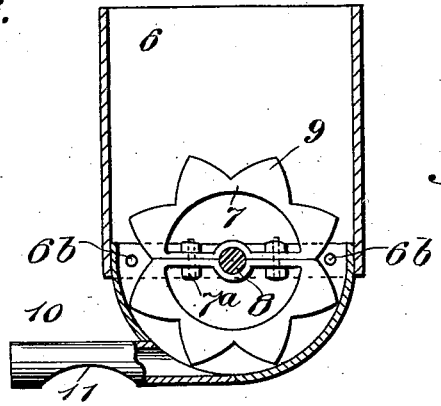

Figure 1 is a central vertical section of a series of buckets with the feed-wheels therein. Fig. 2 is a vertical cross-section. Fig. 3 is a detail in elevation of one of the wheels, and Fig. 4 is a cross-section of a modification.

Referring specifically to the drawings, a series of buckets or hoppers are indicated at 6, the bottoms of which are semicircular, or substantially so, to conform to the peripheral line of the wheels 7, which rotate on a shaft 8, extending through the row of buckets. The wheels have teeth or projections 9 to force the salt or other material out of spouts 10, which tap the buckets at the bottom thereof. These spouts extend laterally in substantially a horizontal direction and have openings 11 on their under sides, through which the stuff falls.

In one form, as shown in Fig. 2, the sides of the bucket are slotted from the top down to receive the shaft 8, which turns at the bottom of the slots. This permits the buckets to be removed from the shaft without unshipping the shaft. To close the slots, slides or slidable sections 12 are used, which slide in grooves produced at the edges of the slots. The slides are shaped at the bottom to fit over the shafts 8 and form a tight joint, and they are readily removable when desired.

The wheels are split, as shown in Fig. 3, and the sections joined by bolts $7^a$, so that the wheels can be removed from the shaft when desired.

In the modified form shown in Fig. 4 the buckets are divided horizontally at the line of the shaft into sections, which lap and are held together by bolts $6^b$ at said line. To remove the buckets, it is simply necessary to take out the bolts and part the sections.

The construction disclosed dispenses with the necessity for a separate casing for the feeding-wheels and allows the same to be inserted in the bucket or hopper from which the material is fed.

What I claim as new, and desire to secure by Letters Patent, is—

1. In a feeder for a bag-filling machine, in combination, a bucket or hopper having a discharge-spout at the lower end and slots in opposite sides thereof, a shaft extending through the lower ends of the slots and having a feeding-wheel in the bucket, and slides closing the slots above the shaft.

2. In a feeder for a bag-filling machine, in combination, buckets having sectional sides and a discharge-spout at the bottom, a shaft extending across the buckets and having feeding-wheels thereon, the joints of the sections being at the shaft, so that the buckets may be parted and removed therefrom, substantially as described.

In testimony whereof I have signed my name to this specification in the presence of two subscribing witnesses.

FREDERICK DEDREUX.

Witnesses:
JOHN A. BOMMHARDT,
LOTTIE NEWBURN.